United States Patent [19]
Kahl et al.

[11] Patent Number: 5,969,567
[45] Date of Patent: Oct. 19, 1999

[54] CIRCUIT CONFIGURATION FOR LINE ADAPTATION AND ECHO SUPPRESSION

[75] Inventors: Alexander Kahl; Peter Caldera; Joerg Hauptmann; Franz Dielacher, all of Villach, Austria

[73] Assignee: Siemens Aktiengesellschaft, Munich, Germany

[21] Appl. No.: 08/824,442

[22] Filed: Mar. 26, 1997

[30] Foreign Application Priority Data

Mar. 26, 1996 [DE] Germany .................. 196 11 941

[51] Int. Cl.⁶ ........................................ H03K 5/00
[52] U.S. Cl. ..................... 327/552; 327/551; 379/399; 379/406
[58] Field of Search ........................ 327/551, 552, 327/310; 379/399, 410

[56] References Cited

U.S. PATENT DOCUMENTS

| | | | |
|---|---|---|---|
| 4,161,633 | 7/1979 | Treiber | 179/170.2 |
| 4,232,400 | 11/1980 | Yamamoto et al. | 327/552 |

OTHER PUBLICATIONS

"A Signal–Processing Codec Filter for PCM Applications", Vogel et al., Siemens Forschungs–und Entwicklungsberichte 15, 1986, No. 5, Berling, pp. 253–258.

Published International Application WO 90/13185, (Eriksson), dated Nov. 1, 1990.

*Primary Examiner*—Dinh T. Le
*Attorney, Agent, or Firm*—Herbert L. Lerner; Laurence A. Greenberg

[57] ABSTRACT

A circuit configuration for line adaptation and echo suppression includes a balance filter which is triggered by transmission signals and supplies output signals that are linked through a subtractor to a reception signal. An impedance adaptation filter is triggered by the reception signal and supplies an output signal that is linked through an adder to the transmission signal. An analog/digital converter converts analog reception signals into digital reception signals. A digital/analog converter converts digital transmission signals into analog transmission signals. The impedance adaptation filter processes digital signals and the balance filter processes analog signals.

2 Claims, 1 Drawing Sheet

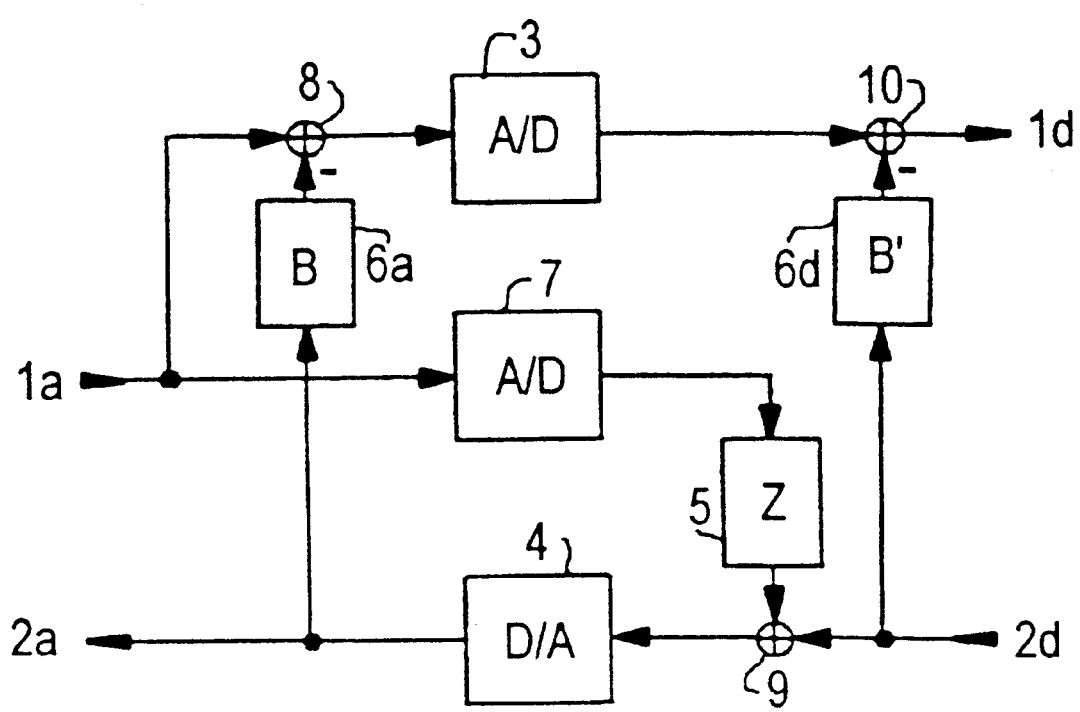

5,969,567

CIRCUIT CONFIGURATION FOR LINE ADAPTATION AND ECHO SUPPRESSION

BACKGROUND OF THE INVENTION

Field of the Invention

The invention relates to a circuit configuration for line adaptation and echo suppression including a balance filter which is triggered by transmission signals and has output signals that are linked through a subtractor to a reception signal, an impedance adaptation filter which is triggered by the reception signal and has an output signal that is linked through an adder to the transmission signal, an analog/digital converter for converting analog reception signals into digital reception signals, and a digital/analog converter for converting digital transmission signals into analog transmission signals.

One such circuit configuration is known, for instance, from an article by D. Vogel, E. Schmid, J. Reisinger and L. Lerach, entitled "A Signal-Processing Codec Filter for PCM Applications", Siemens Forschungs-und Entwicklungsberichte [Siemens Research and Development Reports] 15 (1986), No. 5, Berlin, pp. 253–258. In that configuration, an analog/digital converter located in the reception path and a digital/analog converter located in the transmission path are provided. An impedance adaptation filter (Z filter) and a balance filter (B filter) are used on the digital side. The impedance adaptation filter picks up digital reception signals at the output of the analog/digital converter and filters them. The output signal of the impedance adaptation filter, which is linked to the transmission signal, is delivered to the digital/analog converter through the use of the adder. The balance filter is likewise constructed digitally and is accordingly triggered by the digital transmission signal. The output signal of the balance filter is linked through the subtractor (or a further adder) to the digital reception signal.

Circuit configurations of the kind referred to at the outset are used particularly in electronic two-wire/four-wire converters, but echo terms which can occur therein depending on the line length under some circumstances are multiple times greater than the received useful signal. The intent is to filter out those echo terms through the use of the balance filter. To that end, the echo path is simulated by the balance filter. The echo terms are eliminated by the ensuing subtraction of output signals from the reception signal. However, in that way the deletion of only linear terms can be attained. If the digital/analog converter and/or the analog/digital converter produces harmonics because of its nonlinearities, then those harmonics pass unfiltered into the reception path and thus reduce the attainable signal-to-noise ratio.

SUMMARY OF THE INVENTION

It is accordingly an object of the invention to provide a circuit configuration for line adaptation and echo suppression, which overcomes the hereinafore-mentioned disadvantages of the heretofore-known devices of this general type.

With the foregoing and other objects in view there is provided, in accordance with the invention, a circuit configuration for line adaptation and echo suppression, comprising a balance filter triggered by transmission signals and supplying output signals; a subtractor linking the output signals of the balance filter to a reception signal; an impedance adaptation filter triggered by the reception signal and supplying an output signal; an adder linking the output signal of the impedance adaptation filter to the transmission signal; an analog/digital converter for converting analog reception signals into digital reception signals; and a digital/analog converter for converting digital transmission signals into analog transmission signals; the impedance adaptation filter processing digital signals and the balance filter processing analog signals.

An advantage of the invention is that the impedance adaptation filter is constructed digitally, so that it can be programmed in a simple way, and even complex filter terms can be taken into account at no major expense. Conversely, the balance filter is constructed in technology at reasonable expense, and not only linear echo terms but also harmonic components, particularly of the digital/analog converter, can be filtered out. The nonlinearities of the analog/digital converter moreover play no further role either, since the levels of the echo signal are already greatly attenuated by the balance filter even before the analog/digital converter. All of this is attained by providing that the balance filter is disposed on the analog side and the impedance adaptation filter on the digital side.

In accordance with another feature of the invention, the analog reception signals are applied to the impedance adaptation filter with the interposition of a further analog/digital converter. In this further feature of the invention, influences of the balance filter on the impedance adaptation filter are eliminated because of the further analog/digital converter and the additional signal path based thereon.

In accordance with a concomitant feature of the invention, there is provided a further balance filter that processes digital signals, which makes the demands made of the balance filter that processes analog signals less stringent, so that the expense for the analog balance filter can be greatly reduced without major sacrifices in transmission quality. For instance, a desired balance filter can be split in such a way that the analog partial filter attains the highest possible fundamental echo attenuation with relatively simple provisions, while the remainder of the echo attenuation, which would, for instance, entail high additional expense, is realized in a simply way by digital provisions. Consequently, through the use of the further balance filter and a suitable construction the two balance filters, an optimal cost-benefit ratio is attained.

Other features which are considered as characteristic for the invention are set forth in the appended claims.

Although the invention is illustrated and described herein as embodied in a circuit configuration for line adaptation and echo suppression, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single drawing.

BRIEF DESCRIPTION OF THE DRAWING

The FIGURE of the drawing is a schematic and block circuit diagram of an exemplary embodiment of the invention.

DESCRIPTION OF THE PREFERRED EMBODIMENTS

Referring now in detail to the single figure of the drawing, there is seen an exemplary embodiment of a circuit configuration of the invention, having an analog/digital converter 3 for converting an analog reception signal 1*a* into a digital reception signal 1*d* and a digital/analog converter 4 for converting a digital transmission signal 2*d* into an analog transmission signal 2*a*. An analog balance filter 6*a* with transmission performance suitable for echo suppression is connected on the input side to an output of the digital/analog converter 4 and is accordingly triggered by the analog transmission signal 2*a*. An output of the analog balance filter 6*a* is connected to an inverting input of an analog subtractor 8. The analog reception signal 1*a* is carried by way of a noninverting input and an output of the analog subtractor 8 to the analog/digital converter 3. Interfering echo signals are consequently filtered out by the analog balance filter 6*a* and subtracted from the analog reception signal 1*a* through the use of the analog subtractor 8.

In order to provide impedance adaptation to a non-illustrated line installed on the analog side, an impedance adaptation filter 5 is provided. According to a further feature of the invention, the impedance adaptation filter 5 is triggered by the analog reception signal 1*a* with the interposition of a further analog/digital converter 7. An output of the impedance adaptation filter 5 is connected to one input of a digital adder 9. The digital adder 9 has another input and an output by way of which the digital transmission signal 2*d* is carried to an input of the digital/analog converter 4.

Finally, a further digital balance filter 6*d* is connected between the digital transmission path and the digital reception path. The digital transmission signal 2*d* is applied to an input of the digital balance filter 6*d* which has an output that is connected to an inverting input of a digital subtractor 10. A noninverting input of the subtractor 10 is in turn connected to an output of the analog/digital converter 3, and an output thereof carries the digital reception signal 1*d*. The digital balance filter 6*d* in the present exemplary embodiment supplements the analog balance filter 6*a*, in such a way that the analog balance filter 6*a* already offers good preliminary compensation, particularly with respect to deleting nonlinear terms, and the digital balance filter 6*d* suppresses remaining echoes at low expense for circuitry. Due to the precompensation, the demands made of the analog/digital converter 3 and the digital/analog converter 4 advantageously become less stringent.

The structure of the balance filters 6*a* and 6*d* and of the impedance adaptation filter 5, like the choice of the suitable analog/digital converters 3 and 7 and the digital/analog converter 4, depends on the particular individual application and can therefore vary over a wide range. The converters 3, 7, 4 may operate by arbitrary converter principles and may include arbitrary additional operational devices, such as preceding and subsequent filters, sample and hold devices, etc. Instead of the adder, a subtractor may be used, and instead of the subtractors, adders may also be used, given a suitable signal phase relationship. The circuit configuration shown in the exemplary embodiment is preferably preceded by a non-illustrated two-wire/four-wire converter, which is connected in turn to a two-wire telephone line, for instance.

We claim:

1. A circuit for connecting subscriber equipment through a two-wire/four-wire converter to a two-wire telephone line, the circuit receiving a subscriber output signal from the subscriber equipment and transmitting a transmission signal to the two-wire telephone line, the circuit receiving a reception signal from the two-wire telephone line and transmitting a modified reception signal to the subscriber equipment, the circuit comprising:

an impedance filter having an input receiving the reception signal and an output outputting an impedance filter output signal;

an adder receiving the impedance filter output signal and receiving and adding the subscriber output signal to the impedance filter output signal forming the transmission signal received by the two-wire telephone line;

a balance filter having an input receiving the transmission signal and an output outputting a balance filter output signal;

a subtractor receiving the reception signal and receiving and subtracting the balance filter output signal from the reception signal forming the modified reception signal, said subtractor outputting the modified reception signal to the subscriber equipment; and said impedance filter and said adder operating in a digital signal domain, and said balance filter and said subtractor operating in an analog signal domain.

2. The circuit according to claim 1, including a further subtractor and a further balance filter having an input receiving the subscriber output signal and outputting a further balance filter output signal received by said further subtractor, said further subtractor receiving the modified reception signal and subtracting the further balance filter output signal from the modified reception signal.

\* \* \* \* \*